(12) United States Patent
Barton et al.

(10) Patent No.: US 10,049,656 B1
(45) Date of Patent: Aug. 14, 2018

(54) GENERATION OF PREDICTIVE NATURAL LANGUAGE PROCESSING MODELS

(71) Applicant: Amazon Technologies, Inc., Reno, NV (US)

(72) Inventors: William Folwell Barton, Harvard, WA (US); Rohit Prasad, Acton, MA (US); Stephen Frederick Potter, Seattle, WA (US); Nikko Strom, Kirkland, WA (US); Yuzo Watanabe, Seattle, WA (US); Madan Mohan Rao Jampani, Bothell, WA (US); Ariya Rastrow, Seattle, WA (US); Arushan Rajasekaram, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/033,346

(22) Filed: Sep. 20, 2013

(51) Int. Cl.
  *G10L 15/18* (2013.01)
  *G10L 15/22* (2006.01)
  *G10L 15/02* (2006.01)

(52) U.S. Cl.
  CPC .......... *G10L 15/02* (2013.01); *G10L 15/1815* (2013.01); *G10L 15/22* (2013.01)

(58) Field of Classification Search
  CPC .......................... G10L 15/22; G10L 15/1815
  See application file for complete search history.

(56) References Cited

U.S. PATENT DOCUMENTS

| | | | |
|---|---|---|---|
| 7,346,515 B2* | 3/2008 | Mizutani et al. | 704/277 |
| 8,352,245 B1* | 1/2013 | Lloyd | G10L 15/183 704/9 |
| 9,292,487 B1* | 3/2016 | Weber | G06F 17/27 |
| 9,786,281 B1* | 10/2017 | Adams | G10L 15/265 |
| 2002/0052873 A1* | 5/2002 | Delgado | G06F 17/30864 |
| 2002/0087309 A1* | 7/2002 | Lee et al. | 704/240 |
| 2002/0107690 A1* | 8/2002 | Souvignier | G10L 15/18 704/251 |
| 2002/0116191 A1* | 8/2002 | Olsen | G10L 15/06 704/251 |
| 2002/0133347 A1* | 9/2002 | Schoneburg et al. | 704/257 |
| 2003/0130899 A1* | 7/2003 | Ferguson | G06Q 30/0601 705/26.1 |
| 2004/0249628 A1* | 12/2004 | Chelba | G06F 17/2715 704/4 |
| 2006/0149681 A1* | 7/2006 | Meisner | G06Q 30/06 705/52 |

(Continued)

*Primary Examiner* — Paras D Shah
*Assistant Examiner* — Bryan S Blankenagel
(74) *Attorney, Agent, or Firm* — Knobbe, Martens, Olson & Bear, LLP

(57) ABSTRACT

Features are disclosed for generating predictive personal natural language processing models based on user-specific profile information. The predictive personal models can provide broader coverage of the various terms, named entities, and/or intents of an utterance by the user than a personal model, while providing better accuracy than a general model. Profile information may be obtained from various data sources. Predictions regarding the content or subject of future user utterances may be made from the profile information. Predictive personal models may be generated based on the predictions. Future user utterances may be processed using the predictive personal models.

22 Claims, 5 Drawing Sheets

(56) References Cited

U.S. PATENT DOCUMENTS

| | | | |
|---|---|---|---|
| 2007/0219779 A1* | 9/2007 | Kojima | G10L 15/197 704/9 |
| 2007/0239637 A1* | 10/2007 | Paek | G06F 17/276 706/20 |
| 2008/0086441 A1* | 4/2008 | Wolff | G06N 5/022 706/59 |
| 2008/0281806 A1* | 11/2008 | Wang | G06F 17/30663 |
| 2008/0294624 A1* | 11/2008 | Kanigsberg | G06F 17/30867 |
| 2009/0030698 A1* | 1/2009 | Cerra | G10L 15/30 704/275 |
| 2010/0153366 A1* | 6/2010 | Liu | G06F 17/30616 707/722 |
| 2010/0191682 A1* | 7/2010 | Takamatsu | G06Q 30/02 706/12 |
| 2010/0299142 A1* | 11/2010 | Freeman et al. | 704/9 |
| 2010/0325205 A1* | 12/2010 | Murphy | G06Q 10/10 709/204 |
| 2011/0035272 A1* | 2/2011 | Bhatt | G06Q 30/02 705/14.42 |
| 2011/0131042 A1* | 6/2011 | Nagatomo | G10L 15/18 704/240 |
| 2011/0238608 A1* | 9/2011 | Sathish | G06Q 30/02 706/47 |
| 2012/0016671 A1* | 1/2012 | Jaggi et al. | 704/235 |
| 2012/0020473 A1* | 1/2012 | Mart | H04L 12/5855 379/265.09 |
| 2012/0166377 A1* | 6/2012 | Sathish | G06Q 10/00 706/47 |
| 2012/0174159 A1* | 7/2012 | Arte | H04N 21/2668 725/46 |
| 2012/0191449 A1* | 7/2012 | Lloyd | H04M 1/04 704/231 |
| 2012/0223889 A1* | 9/2012 | Medlock | G06F 3/04883 345/168 |
| 2014/0267045 A1* | 9/2014 | Grieves | G06F 17/2735 345/168 |
| 2014/0379346 A1* | 12/2014 | Aleksic | G10L 15/25 704/251 |
| 2015/0186362 A1* | 7/2015 | Li | G06F 17/2223 704/3 |

* cited by examiner

GENERATION OF PREDICTIVE NATURAL LANGUAGE PROCESSING MODELS

BACKGROUND

Natural language processing systems typically include one or more models that they use to process input. For example, automatic speech recognition systems typically include an acoustic model and a language model. The acoustic model is used to generate hypotheses regarding which words or subword units (e.g., phonemes) correspond to an utterance based on the acoustic features of the utterance. The language model is used to determine which of the hypotheses generated using the acoustic model is the most likely transcription of the utterance based on lexical features of the language in which the utterance is spoken. As another example, natural language understanding systems typically include models for named entity recognition, intent classification, and the like. The natural language understanding models can be used to determine an actionable intent from the words that a user speaks or writes.

Acoustic models, language models, natural language understanding models, and other models used in spoken language understanding (together referred to as spoken language understanding models), may be specialized or customized to varying degrees. For example, an automatic speech recognition system may have a general or base model that is not customized in any particular manner, and any number of additional models for particular genders, age ranges, regional accents, speakers, or any combination thereof. Some systems may have models for specific subject matter (e.g., medical terminology) or even specific users.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

Figure 1:
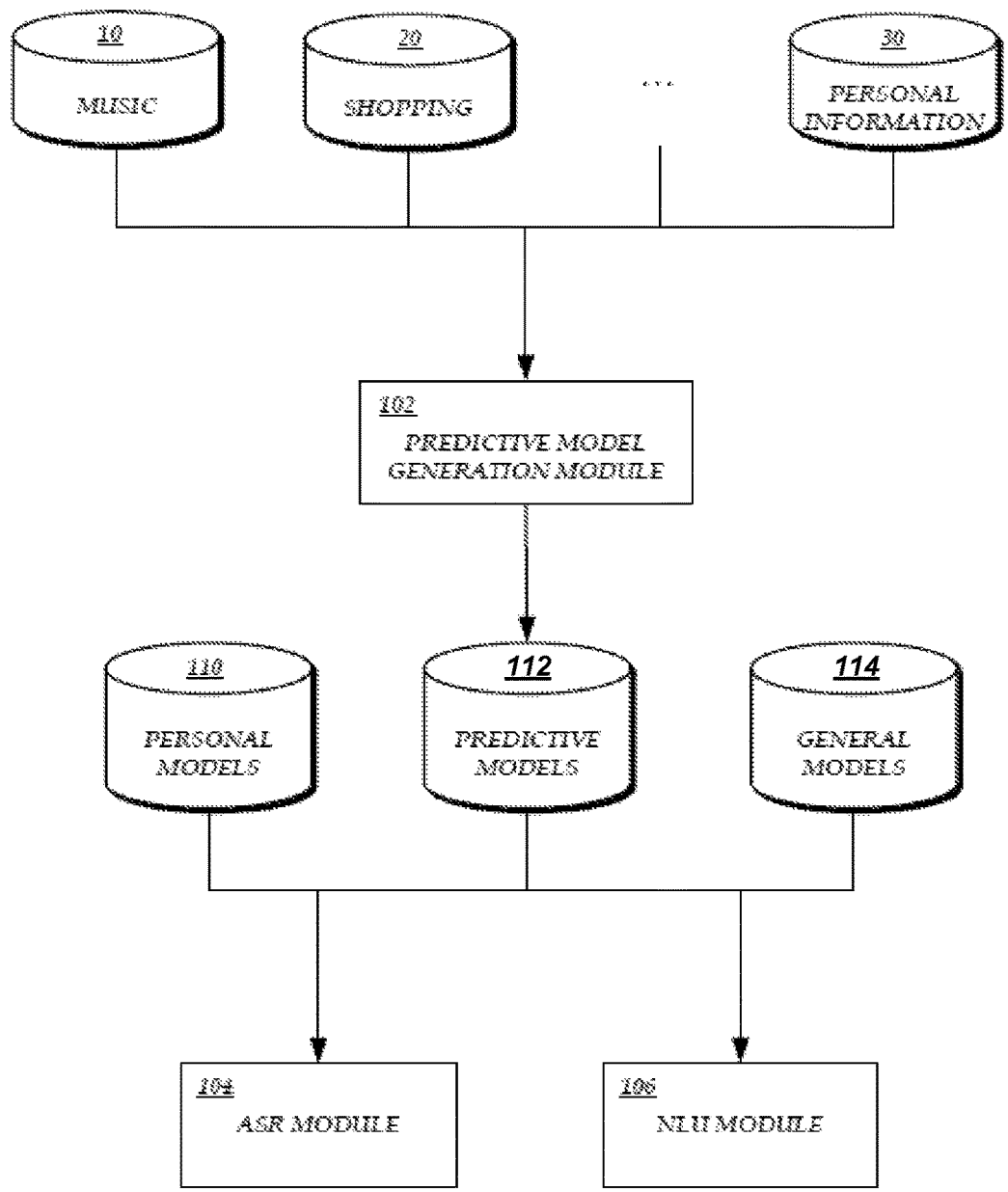
FIG. 1 is a block diagram of an illustrative architecture for predictive personal model generation and use, including a predictive model generation module and several example sources of user-specific data.

The present disclosure is directed to enhancing the accuracy and scope of natural language processing ("NLP") systems through the use of predictive personal NLP models.

Many NLP systems use general models, such as automatic speech recognition ("ASR") models or natural language understanding ("NLU") models that are based on the expected word usage or characteristics of a general population. Such general models can provide a broad scope of coverage when performing ASR or NLU, allowing terms (e.g., words or phrases) and intents (e.g., commands regarding particular items) to be recognized even when used by a user for the first time. However, exclusive or heavy reliance on general models can limit the ability of NLP systems to accurately discriminate between, e.g., terms or intents typically used by an individual user and similar or confusable terms or intents used by a general population. Some NLP systems use personalized or customized models. For example, a system may generate a personal model based on user-specific information (e.g., music preferences, movie preferences, contact listings, etc.). ASR, NLU and other NLP processes performed with the personal models can achieve a higher degree of accuracy when the user references, e.g., an item in the user's personal catalog. However, the personal models are much smaller than the general models, typically by several orders of magnitude, and therefore do not provide a broad enough range of coverage relative to the full universe of things a user may say or write. As a consequence, exclusive or heavy reliance on personal models can limit the ability of the NLP systems to correctly process user utterances that reference items outside of the user's personal catalogs.

Aspects of the present disclosure relate to generation of predictive personal models for use by language processing systems, such as those that perform ASR and/or NLU. Predictive personal models may be based on user-specific information, such as user-specific catalogs of data (e.g., music catalogs, movie catalogs, contact listings, shopping history, etc.), user demographics, connections with other users, historical information about prior interactions with the system, information regarding user behaviors, and the like. Such information may be collectively referred to as "profile information." However, rather than being limited to terms, entities, or intents found in the profile information, predictive personal models may include terms, entities, or intents that are related to the profile information or are otherwise likely to be used in light of the profile information. For example, recommendation engines or prediction techniques may be used to determine, given some corpus of profile information, which terms (e.g., words or phrases), intents, named entities, and the like a user is likely to use in addition to those found within the profile information. The predicted terms, entities and intents may be collectively referred to as "utterance content." Predictive personal models based on the recommendations or predictions include, e.g., the terms, entities, or intents, among those not found in profile information, that are the most likely to be used by the respective users. Such predictive personal models may provide better accuracy when users reference terms, entities or intents outside of, e.g., their personal catalogs, or otherwise use terms, entities, or intents outside of their personal models. Because the predictions are targeted at a particular user, the size of the predictive personal model may be much smaller than a general model (often by several orders of magnitude) while providing better accuracy for the corresponding user. In some embodiments, the predictive personal model also includes the information that would be included in a conventional personal model. In other embodiments, the predictive personal model includes only related or predicted information, or is otherwise separate from a conventional personal model.

Additional aspects of the present disclosure relate to using predictive personal models to perform language processing tasks, such as ASR and NLU. Predictive personal models may be used alone, or they may be used in conjunction with one or more personal models and/or general models. For example, when an ASR module performs ASR on an utterance from a particular user, the ASR module may interpolate a personal language model (e.g., including only terms found in the user's profile information), a predictive model (e.g., including predictions and other information based on the user's profile information), and a general model (e.g., based on the vocabulary of a general population). The various models may be weighted such that, e.g., items in or related to the user's personal catalogs will be recognized with a high degree of accuracy, while other items, such as items unrelated to the user-specific catalogs, may also be recognized with a high degree of accuracy. In some embodiments, as described in greater detail below, techniques other than language model interpolation may be used. In some embodiments, as described in greater detail below, predictive NLU models may be used in some combination with personal and/or general models.

Although aspects of the embodiments described in the disclosure will focus, for the purpose of illustration, on generating predictive personal models for individual users, one skilled in the art will appreciate that the techniques disclosed herein may be applied to any number of services, processes, or applications. For example, predictive models may be generated for groups of multiple users with similar catalogs of user-specific information, similar demographic characteristics, some combination thereof, etc. The user-specific information associated with each user in the group, or with a representative subset of users, may be used to generate the predictions and related information on which the predicted personal models are based. Various aspects of the disclosure will now be described with regard to certain examples and embodiments, which are intended to illustrate but not limit the disclosure.

With reference to an illustrative embodiment, FIG. 1 shows a predictive model generation module 102 configured to generate predictive personal models based at least on user-specific information, also referred to as profile information, that is relevant to NLP personalization. Generally described, the predictive model generation module 102 can use any personal catalog information, user demographic information, historical interaction information, information about user connections or behaviors, or any other information that provides a clue to likely future utterances. The predictive personal models may include ASR models (e.g., language models or acoustic models), NLU models, or any other model used by a language processing system.

The user-specific data may come from various data sources. The data sources may be associated with the predictive model generation module 102 or with a language processing system of which the predictive model generation module 102 is a part. The data sources may also or alternatively be separate from the language processing system.

As one example, a user may use a music service. The user may purchase or otherwise access music files or streams, listen to music, create playlists, and the like. The data maintained by the music service is relevant to NLP personalization because, e.g., a user is more likely to use the names of artists and songs in the user's personal music catalog than those that are not. The predictive model generation module 102 may access a music data source 10 (e.g., a network-accessible music service, a catalog stored locally on the user's device, etc.) in order to obtain user-specific music data. The predictive model generation module 102 may utilize the information from the music data source 10 to generate a predictive personal model for the user. The predictive model generation module 102 may employ recommendation or prediction algorithms, modules, components, or systems to generate a list of likely terms or intents. The terms or intents in the list may be related to user-specific data from the music data source 10, or are otherwise predicted to be used in the future based on the user-specific data from the music data source 10. Illustratively, a user may listen to jazz music. The predictive model generation module 102 may include the names of popular jazz artists or of jazz artists with material in the same sub-genre as the artists in the user's personal catalog. The predictive model generation module 102 may include measurements in the generated predictive personal mode regarding the likelihood or probability that the user will reference each term or intent. In the present example, the predictive personal model may include likelihoods that the user will reference each additional jazz artist.

FIG. 1 includes additional example sources of profile information relevant to NLP personalization, such as a shopping data source 20 and a personal information manager ("PIM") data source. 30. The data maintained by the shopping data source 20 is relevant to NLP personalization because, e.g., a user is likely to use terms and intents associated with items that the user has browsed or bought. Illustratively, the user may have browsed for various items in a particular class of goods (e.g., electronics), and terms or intents regarding other items in the same class of goods may be added to the predictive personal model, as described above. The data maintained by the PIM data source 30 is relevant to NLP personalization because, e.g., a user is likely to use terms and intents associated with items in the user's calendar, contact list, emails, and the like. Illustratively, the user may use particular words or phrases in emails or calendar entries, and terms or intents regarding other related words or phrases may be added to the predictive personal models, as described above.

Profile information that is relevant to NLP personalization may be obtained from a variety of sources, not limited those shown in FIG. 1 or described herein. For example, data related to video catalogs, content browsing history, social networks, etc. may be used to generate predictive personal models. The data may be proactively retrieved by a data harvesting service associated with the predictive model generation module 102, or the data sources may provide information about user-specific catalogs to a data harvesting service. One example of a data harvesting service that may be used to obtain user-specific data is described in U.S. patent application Ser. No. 14/015,697, filed on Aug. 30, 2013 and incorporated herein by reference for all that it discloses.

In some embodiments, the predictive model generation module 102 may also use demographic information or other information about user characteristics, device characteristics, and the like to generate predictive personal models. For example, the predictive model generation module 102 may determine that users of a particular age group are more likely to use certain terms or intents than users of another age group. As another example, the predictive model generation module 102 may determine that users in a particular geographic area are more likely to use certain terms or intents than users in another geographic area. Virtually any demographic or other clustering parameter or characteristic may be used, including but not limited to: age, birthplace, current home location, work location, level of academic achievement, profession, income, gender, marital status, etc. In addition, behavior parameters may be used to group users. For example: a user typically requests an intent A at a particular time of day; a user often speaks intent B as a follow up to intent C; a use uses particular syntactic forms to express intent D; the number of purchases from a particular web site; the items purchased; browsing/searching behavior, etc.

In some embodiments, cross-domain predictions may be used during the predictive personal model generation process. For example, users in age group X who listen to music by artist A may also be likely to listen to music by artist B and watch movies in genre M. However, users in age group Y who listen to music by artist A may be likely to listen to music by artists C and D, but unlikely to listen to music by artist B. The users in age group Y may also be likely to watch movies in genre N but unlikely to watch movies in genre M. The example cross-domain predictions described herein are illustrative only. Generally described, a personal model generation module 102 may detect correlations or relationships between any user-specific data and data not located in user-specific data stores, and may use such relationships as a basis for adding data to a predictive personal model. Any recommendation or prediction technique that detects or otherwise uses such relationships may be used to generate items for inclusion in predictive personal model.

As shown in FIG. 1, a predictive model generation module 102 may generate a predictive personal model for a particular user and store the model in a predictive personal models data store 120. An ASR module 104 or NLU module 106 may use the predictive personal model to perform ASR or NLU, respectively, for the user with whom the predictive personal model is associated. The ASR module 104 and/or NLU module 106 may also use one or more additional models to perform their respective functions, as described in greater detail below. Returning to the music example, a personal model associated with a particular user may be used to provide accurate NLP results when a user refers to items that are currently in the user's personal music catalog. A general model that is based on the terms or intents used by a general population may be used to broaden the scope of the NLP processing and provide accurate NLP results when a user refers to a new artist for the first time, and that artist is not related to music in the user's personal music catalog. Illustratively, personal models and general models may be accessed from a personal models data store 110 or a general models data store 130, respectively.

Language Processing System Environment

Figure 2:
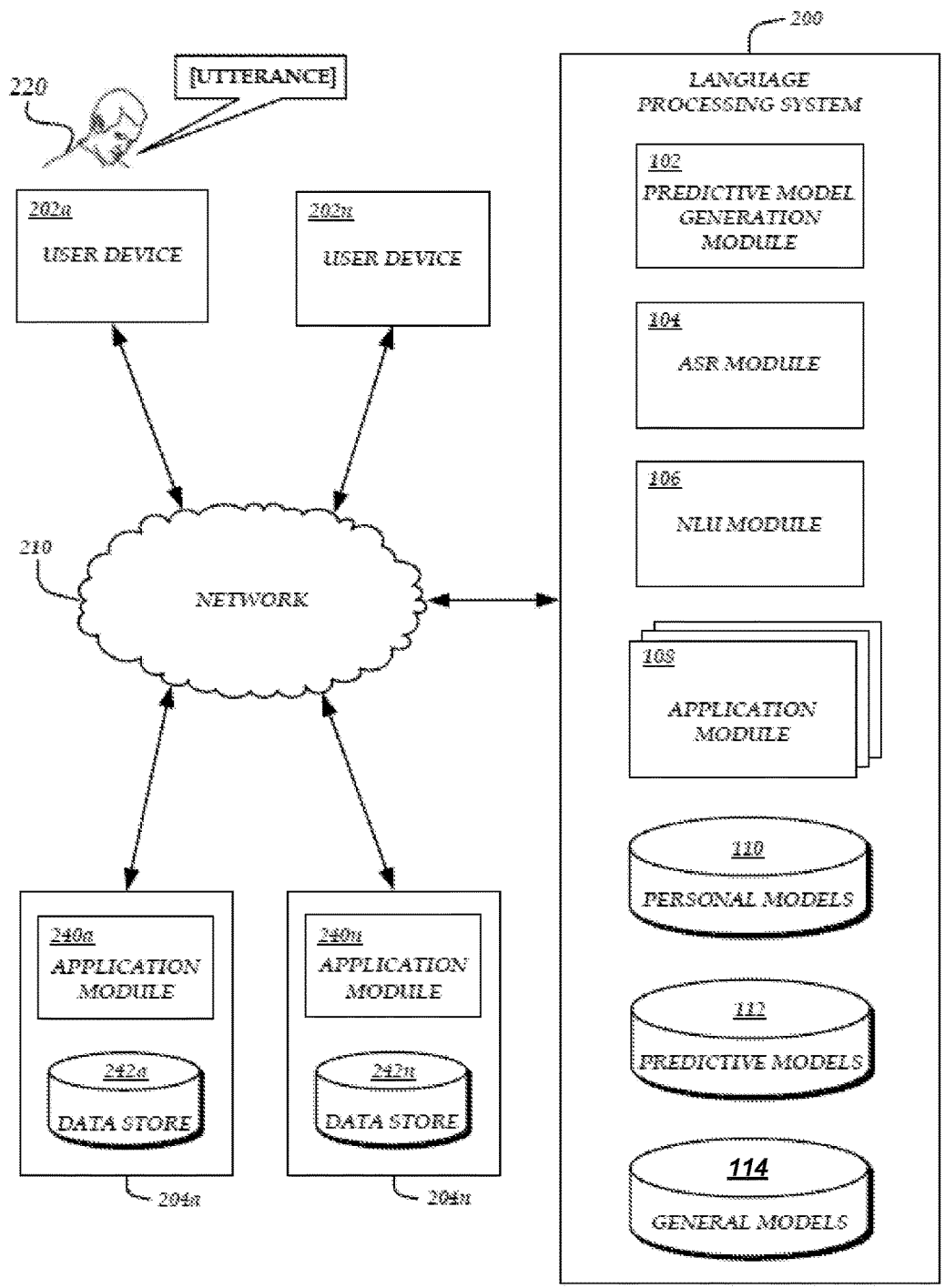
FIG. 2 is a block diagram of an illustrative natural language processing system in a network environment, showing example modules and data stores of the natural language processing system.

FIG. 2 shows an example networked language processing system environment in which the features and processes described herein may be implemented. The networked environment shown in FIG. 2 includes a language processing system 200, multiple user devices 202*a* 202*n*, and multiple data sources 204*a*-202*n*. The various systems may communicate with each other via a communication network 210. The network 210 may be a publicly accessible network of linked networks, possibly operated by various distinct parties, such as the Internet. In other embodiments, the network 210 may include a private network, personal area network, local area network, wide area network, cable network, satellite network, cellular telephone network, etc. or combination thereof, each with access to and/or from the Internet.

The language processing system 200 can be a computing system configured to process user utterances to generate transcripts of the utterances and/or to perform actions in response to the utterances. In some embodiments, language processing system 200 can be a server or group of servers that may be accessed via the network 210. The language processing system 200 can include various components, such as a predictive model generation module 102, an ASR module 104, an NLU module 106, application modules 108, a personal models data store 110, a predictive models data store 120, and a general models data store 130. In some embodiments, the language processing system 200 may have fewer or additional modules, components, or data stores than those shown in FIG. 2. For example, personal models and predictive models may not be separate models, but rather may be combined. In this example, the process of generating the predictive models works by adding information to the personal and/or global model, rather than generating a separate predictive model. Accordingly, a separate predictive models data store 120 may not be used.

The language processing system 200 may include multiple computing devices, such as computer servers, logically or physically grouped together. The components of the language processing system 200 can each be implemented as hardware, such as a server computing device, or as a combination of hardware and software. For example, a predictive model generation module 102 may be implemented on its own server or group of servers, separate from a module or component that generates personal or global models. As another example, a server or group of servers may perform the functions of the predictive model generation module 102 and also generate personal and/or global models. The server or group of servers may be separate from, e.g., the server or group of servers that perform various NLP processes described herein.

In some embodiments, the components of the language processing system 200 can be combined on one server computing device or separated individually or into groups on several server computing devices. For example, an ASR module 104 may be implemented on the same server or group of servers as an NLU module 106. As another example, multiple ASR modules 104 and/or NLU modules 106 may be implemented as scalable computing systems that can scale responsive to current conditions (e.g., network conditions, processing load, computing resource availability, etc.). The personal models data store 110, predictive models data store 120, and/or general models data store 130 may be implemented on a server or group of servers separate from the other modules or components of the language processing system 200, such as a database server.

In some embodiments, the features and services provided by the language processing system 200 may be implemented as web services consumable via the communication network 210. In further embodiments, the language processing system 200 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

The user devices 202*a*-202*n* can correspond to a wide variety of computing devices, including personal computing devices, laptop computing devices, hand held computing devices, terminal computing devices, mobile devices (e.g., mobile phones or tablet computing devices), wearable devices configured with network access and program execution capabilities (e.g., "smart eyewear" or "smart watches"), wireless devices, electronic readers, media players, gaming consoles, set-top boxes, televisions configured with network access and program execution capabilities (e.g., "smart TVs"), and various other electronic devices and appliances.

The data sources 204a-204n can correspond to a logical association of one or more computing devices for hosting interactive content and processing user interactions over the network 210. For example, data source 204a may include a server that hosts an application module 240a for providing music playback capabilities. The data source 204a may also include a server that hosts a data store 242a for storing user-specific music catalogs. As another example, data source 204b may include an application module 240b for providing shopping services, and a data store 242b for storing user-specific shopping information, such as purchase history and browsing history.

In operation, a user 220 of the user computing device 202a may perform various actions, and data may be transmitted to, or exchanged with, a data source 204a-204n. For example, the user may initiate the purchase of a song from a music player service. The data source 204a may process the user actions, update or store data, and the like. In the present example, the data source 204a may update the user's music catalog by adding the purchased song or adding data indicating that the user has purchased the song. The language processing system 200 can access user-specific data associated with the user 220 from the external data sources 204a-204n in order to generate a predictive personal model for the user. In some embodiments, one or more data sources, such as application modules 108, may be internal to the language processing system 200 or otherwise associated with the language processing system 200. For example, a network-based music service may provide the music functionality described above and also allow a user to control aspects of the service via spoken commands.

The user 220 may subsequently initiate make an utterance including a spoken command to the user device 202a. Audio data (e.g., a stream or file including audio of the user utterance) may be transmitted from the user device 202a to the language processing system 200 via the network 210. For example, the language processing system 200 may include an application 108 dedicated to music playback, or an external music service may be associated with the language processing system 200 in order to provide spoken command functionality to users. In some embodiments, the user device 202a may include portions or all of the language processing system 200 locally, such that spoken commands do not need to be transmitted to a separate system for processing. In some embodiments, the user device 202a may include portions or all of the application or service (e.g., music player) with which the user wishes to interact.

Illustratively, the utterance made by the user 220 may be a spoken command to purchase music by an artist that is not in the user's catalog, but which is related to artists that are in the user's catalog. A predictive personal model that includes the related artist's name can provide better ASR or NLU processing results in such a case than a personal model based only on information in the user's catalog. The predictive personal model can also provide better ASR or NLU processing results than a general model that may not adequately discriminate between the related artist's name and other similar-sounding names of artists.

Process for Updating Personal Model

Figure 3:
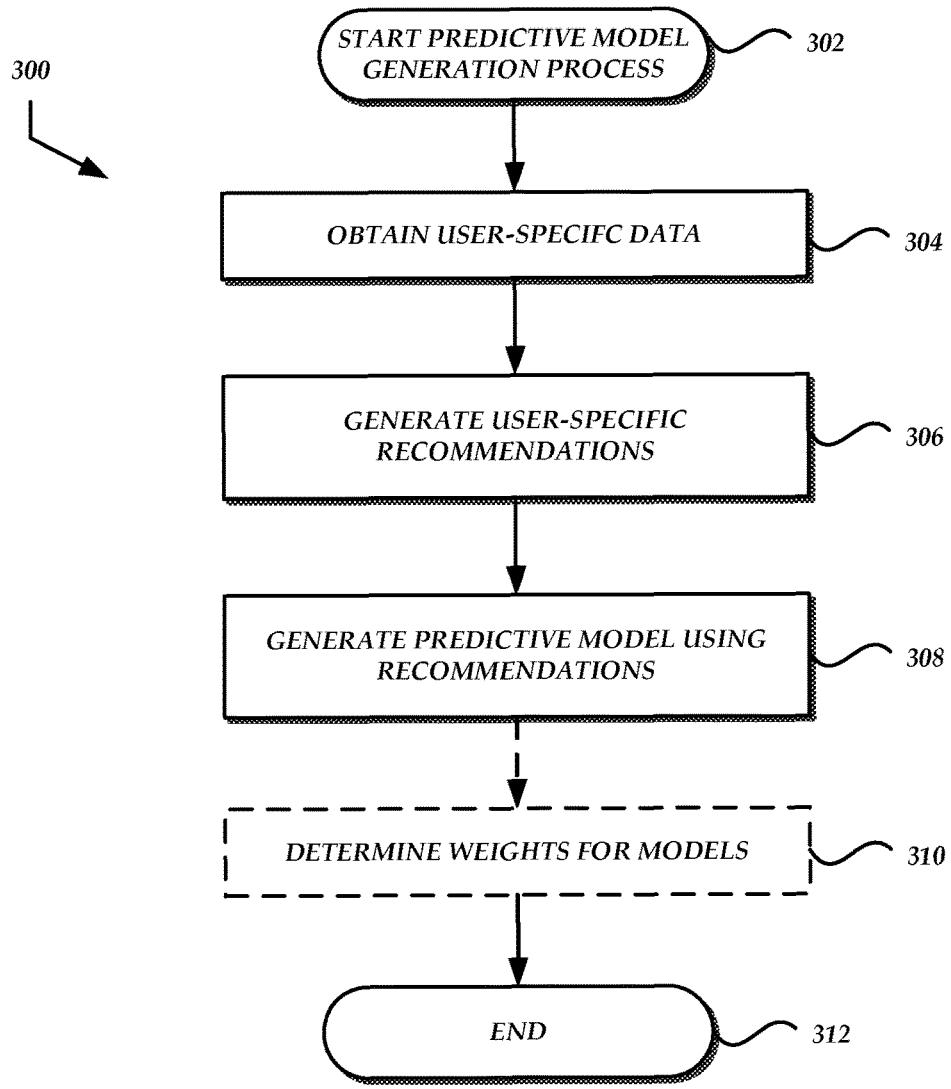
FIG. 3 is a flow diagram of an illustrative process for generating predictive personal natural language processing models.

FIG. 3 illustrates a sample process 300 for generating a predictive personal model for a particular user. Advantageously, a predictive model generation module 102 may execute the process 300 to generate the predictive personal model based on recommendations or other predictions of utterance content determined from profile information. The resulting predictive model can increase the scope of utterance content (e.g., terms, entities, or intents) accurately recognized by a language processing system operating on an utterance from the user. In some embodiments, personal predictive NLU models may be generated and used to process textual input that is not generated by an ASR module (e.g., user-submitted text). In such cases, the predictions may not be predictions of "utterance content," but rather predictions of named entities or intents generally. In some embodiments, several predictive personal models may be generated for a single user, such as predictive personal models for each of several domains (e.g., voice dialing, music playback, shopping, etc.).

The process 300 begins at block 302. For example, process 300 may begin manually or automatically upon registration of a user with the language processing system 200, upon receipt of new user-specific data from a data source 204a-204n, etc. The process 300 may be embodied in a set of executable program instructions stored on non-transitory computer-readable media, such as short-term or long-term memory of one or more computing devices associated with the language processing system 200. When the process 300 is initiated, the executable program instructions can be loaded and executed by the one or more computing devices.

At block 304, the predictive model generation module 102 or some other module or component of the language processing system 200 obtains profile information for the user. As described above, the profile information may be obtained from internal or external data sources. The profile information may have been obtained from the one or more data sources prior to initiation of the process 300 and stored in a data store, or it may be retrieved during execution of the process 300.

At block 306, the predictive model generation module 102 or some other module or component of the language processing system 200 can generate user-specific recommendations or predictions of utterance content from the profile information data obtained above. In some embodiments, the predictive model generation module 102 may generate domain-specific recommendations for the user (e.g., only music playback recommendations) when domain-specific predictive personal modules are to be generated. In some embodiments, cross-domain recommendations may be generated (e.g., relationships between the current contents of a music catalog and likely future movie playback commands are determined). Any recommendation or prediction technique that detects, determines, or otherwise uses relationships between profile information and general data may be used to generate items for inclusion in predictive personal model. One example of a recommendation system is described in U.S. Pat. No. 8,504,441, issued on Aug. 6, 2013 and incorporated herein by reference for all that it discloses.

In one specific, non-limiting example, the recommendations may be a list of terms (e.g., for an ASR model) or entities or intents (e.g., for an NLU model) that the user is likely to include in future utterances. The terms, entities or intents may be present in a general model. However, in the general model the predicted terms, entities or intents may be associated with low probabilities such that an ASR module 102 or NLU module 104 may not accurately discriminate between the predicted items and other similar items that the particular user is less likely to include in an utterance. In the list generated above, the terms or intents may be associated with higher probabilities that more accurately reflect the likelihood that a particular user will include the subject terms or intents in future utterances.

The number of terms, entities, or intents predicted or recommended in block 306 may be based at least partly on a determination of the relative importance of the accuracy provided by the model in comparison with the computing performance when using the model. For example, if accuracy is determined to be more important than latency, resource usage, or other performance metrics, then the size of the predictive personal model may be quite large and, therefore, the number of predictions or recommendations for terms, entities, or intents to use in the predictive model may be quite large. However, in a computing environment with limited resources, or in situations where performance may be more important than achieving the highest levels of accuracy, the predictive personal models may be smaller.

At block 308, the predictive model generation module 102 or some other module or component of the language processing system 200 can generate a predictive model using the recommendations or predictions of utterance content determined above. For example, the predictive model generation module 102 may generate a predictive personal language model for use by the ASR module 103. The predictive model generation module 102 may first generate an intermediate grammar specification with a list of terms and associated probabilities or weightings to be included in the model. The predictive model generation module 102 may then generate a more efficient version of the model, such as compiled finite state machine ("FST"). In some embodiments, the predictive personal model may be compiled into and with the global and/or personal model. For example, a single personalized FST model may be generated without any truly separate predictive personal model.

As described above, the predictive model generation module 102 can also or alternatively generate other types of NLP models, such as an NLU module that can be used for named entity recognition or intent classification. In some embodiments, the predictions or recommendations may be used as features input to the training of predictive personal NLU models for named entity recognition and/or intent classification, along with the general and personal models, resulting in a model that incorporates information from all three sources.

At block 310, the predictive model generation module 102 or some other module or component of the language processing system 200 can optionally determine weights for the predictive personal model, a personal model associated with the user, and/or a general model. As described in greater detail below, an ASR or NLU module using predicted personal models may also use a personal model, a general module, multiples of one or both, etc. In order to facilitate the use of the multiple models to process a single utterance, each model may be weighted. The weightings can emphasize personal models over predictive personal models, and predictive personal models over general models. For example, the weightings may be determined such that terms or intents in the predictive personal model are given more weight than similar or confusable terms in the general model. In some embodiments, weights may be determined or updated during ASR or NLU processing, as described in greater detail below.

The process 300 terminates a block 312.

Sample ASR Process with a Predictive Personal Model

Figure 4:
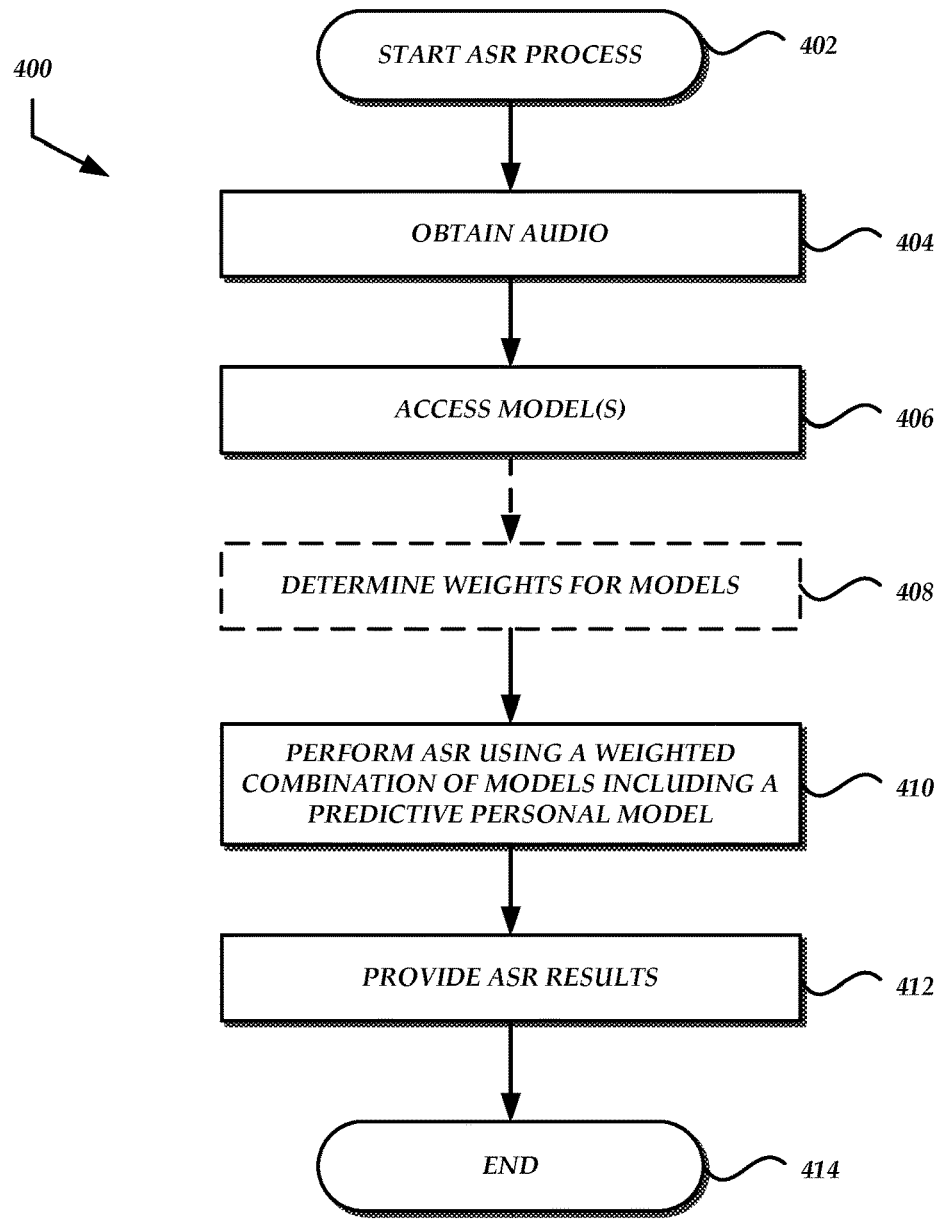
FIG. 4 is a flow diagram of an illustrative process for using predictive personal models to perform automatic speech recognition.

FIG. 4 illustrates a sample process 400 for performing automatic speech recognition on an utterance using a predictive personal model for a particular user. Advantageously, an ASR module 104 may execute the process 400 to generate ASR results that are more accurate than ASR with only a personal and/or general model when a user includes a term that is not in the user's personal catalog or model.

The process 400 begins at block 402. For example, process 400 may begin manually or automatically upon user-initiation of a speech recognition session, upon receipt of utterance audio, etc. The process 400 may be embodied in a set of executable program instructions stored on non-transitory computer-readable media, such as short-term or long-term memory of one or more computing devices associated with the language processing system 200. When the process 400 is initiated, the executable program instructions can be loaded and executed by the one or more computing devices.

At block 404, the ASR module 104 or some other module or component of the language processing system 200 obtains audio of the user utterance. The audio may be received from a user device 202 via a network 210, from a microphone of a computing device on which the ASR module 104 is executing, etc.

At block 406, the ASR module 104 or some other module or component of the language processing system 200 can access a predictive personal ASR model associated with the user. For example, a user identifier (e.g., ID number, username) or user device identifier (e.g., IP address, MAC address) may be provided to the language processing system 200 with the audio data, upon initiation of the speech recognition session, etc. The identifier can be used to access the appropriate predictive personal model. A personal model or general model may also be accessed. In some embodiments, models may be domain-specific, and therefore more than one personal model, predictive personal model, and/or general model may be available.

At block, 408, the ASR module 104 or some other module or component of the language processing system 200 can optionally determine weights for the various models.

At block, 410, the ASR module 104 or some other module or component of the language processing system 200 can perform ASR using the predictive personal model for the current user. In some embodiments, the predictive personal model may be one of multiple models used to perform ASR. For example, if the models are language models, then language model interpolation may be used to perform ASR on the utterance using the multiple models. As another example, the utterance may be processed using one model to produce a lattice of preliminary results, and then the ASR module 104 may perform language model rescoring using a different model.

At block 412, the ASR module 104 or some other module or component of the language processing system 200 can provide ASR results to another NLP component (e.g., an NLU module), an application module 108, an external service, the user device 202, etc. At block 414 the process 400 terminates.

Sample NLU Process with a Predictive Personal Model

Figure 5:
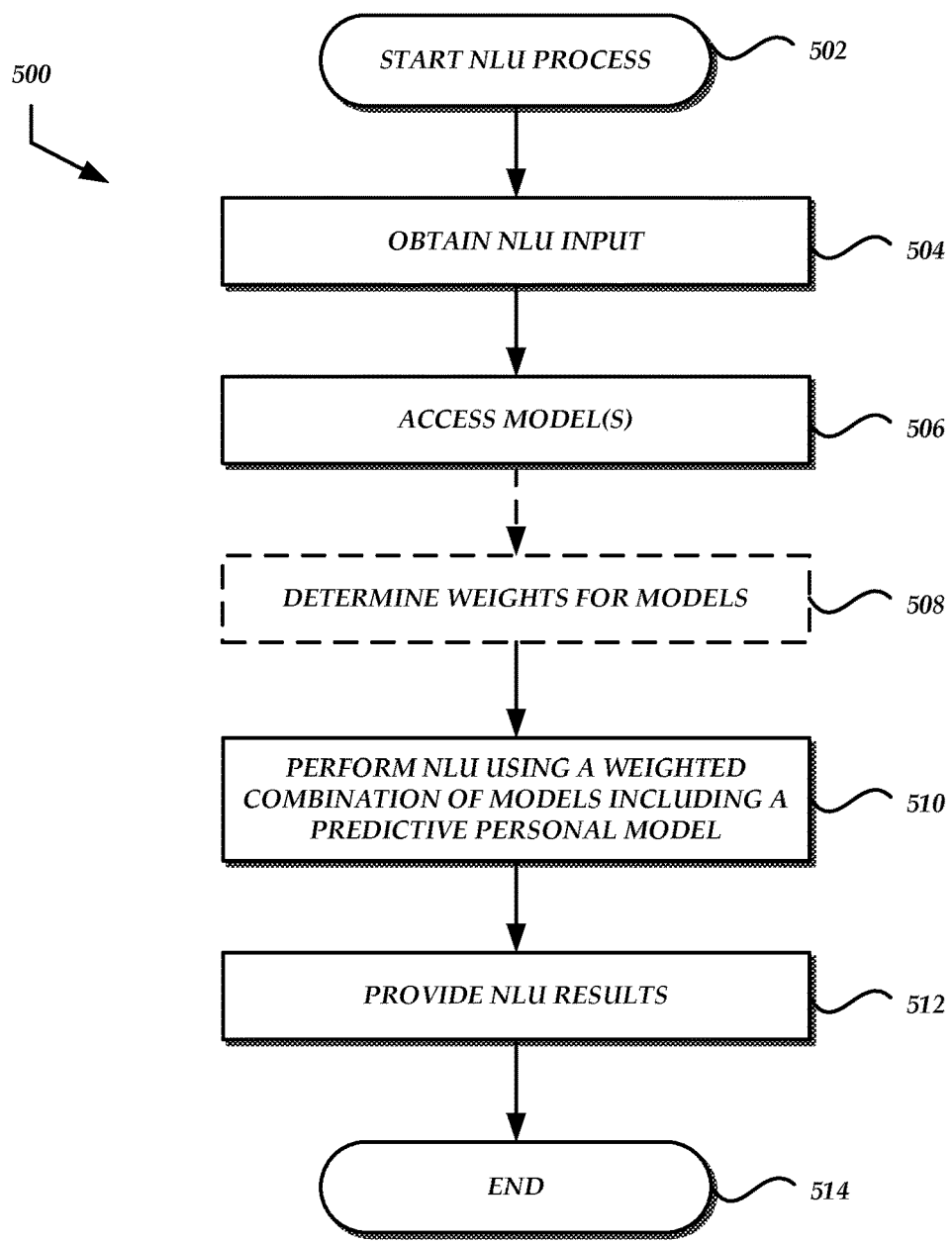
FIG. 5 is a flow diagram of an illustrative process for using predictive personal models to perform natural language understanding processing.

FIG. 5 illustrates a sample process 500 for performing natural language understanding on input, such as text or ASR results, using a predictive personal model for a particular user. Advantageously, an NLU module 106 may execute the process 500 to generate NLU results that are more accurate than NLU with only a personal and/or general model when a user includes an intent that is not in the user's personal catalog or model.

The process 500 begins at block 502. For example, process 500 may begin manually or automatically upon receipt of ASR results. The process 500 may be embodied in a set of executable program instructions stored on non-transitory computer-readable media, such as short-term or long-term memory of one or more computing devices associated with the language processing system 200. When the process 500 is initiated, the executable program instructions can be loaded and executed by the one or more computing devices.

At block 504, the NLU module 106 or some other module or component of the language processing system 200 obtains input, such as ASR results for the current utterance (e.g., a transcript, n-best list of transcripts, lattice), user-entered text, etc.

At block 506, the NLU module 106 or some other module or component of the language processing system 200 can access a predictive personal NLU model associated with the user. For example, the NLU module 106 may access the predictive personal model in a manner similar to that described above with respect to the ASR module 104. In addition, as described above, one or more personal models and/or general models may be accessed.

At block 508, the NLU module 106 or some other module or component of the language processing system 200 can optionally determine weights for the various models.

At block 510, the NLU module 106 or some other module or component of the language processing system 200 can perform NLU using the predictive personal model for the current user. In some embodiments, the predictive personal model may be one of multiple models used to perform NLU. For example, the items and weights generated in the predictive personal model may be incorporated as features (along with the general and personal model features) into models to conduct intent classification, entity recognition and entity resolution. As another example, the predictive personal model may be applied as a post-process on the output of any or all of the above models to re-score the eventual set of hypotheses presented in block 512.

At block 512, the NLU module 106 or some other module or component of the language processing system 200 can provide NLU results to another NLP component, an application module 108, an external service, the user device 202, etc. At block 514 the process 500 terminates.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system comprising:
a computer-readable memory storing executable instructions; and
one or more processors in communication with the computer-readable memory, wherein the one or more processors are programmed by the executable instructions to at least:
obtain natural language processing personalization data associated with a user, the natural language processing personalization data comprising data regarding items in a user-specific content catalog associated with the user;

generate a personal language model using at least the data regarding items in the user-specific content catalog, wherein the personal language model is specific to the user, wherein the personal language model includes a first subset of items in a general language model, and wherein the general language model is not associated with any specific user;

determine, using at least the data regarding items in the user-specific content catalog, a plurality of user-specific predicted items about which the user is predicted to make a future utterance, wherein the plurality of user-specific predicted items are not in the user-specific content catalog;

generate a predictive language model based at least on the plurality of user-specific predicted items, wherein the predictive language model is associated with the user, and wherein the predictive language model includes a second subset of items in the general language model;

generate a weighting factor for the general language model, wherein the weighting factor, when applied to the general language model, reduces probabilities associated with individual items in the general language model that are determined to be acoustically confusable with at least portion of the user-specific predicted items; and subsequently:

process an utterance using the personal language model, the predictive language model, the general language model, and the weighting factor, wherein the utterance includes a first item of the plurality of user-specific predicted items;

recognize the first item based at least on the personal language model, the predictive language model, and the general language model, wherein the first item is recognized based at least partly on a first probability for the first item being higher than a second probability for a second item and a third probability for a third item, wherein a value of the first probability comprises a probability value from the personal language model, wherein a value of the second probability comprises a probability value from the predictive language model, and wherein a value of the third probability comprises a product of the weighting factor and a probability value from the general language model; and play, on a user computing device, audio content associated with the first item.

2. The system of claim 1, wherein the user-specific catalog comprises one of: a music catalog, a video catalog, a contact list, a calendar, a shopping history, or a browsing history.

3. The system of claim 1, wherein the one or more processors are further configured to:

generate, using the utterance, a lattice of processed results; and generate a transcription of the utterance from an automatic speech recognition model and the lattice of processed results.

4. A computer-implemented method comprising:

under control of one or more computing devices configured to execute specific instructions, obtaining content catalog information specific to a user profile;

generating a personal language model based at least on the content catalog information, wherein the personal language model is specific to the user profile, wherein the personal language model includes a first subset of items in a general language model, and wherein the general language model is not associated with any specific user profile;

determining, based at least on the content catalog information, predicted utterance content, wherein the content catalog information does not include the predicted utterance content;

generating a predictive language model based at least on the predicted utterance content, wherein the predictive language model is specific to the user profile, and wherein the predictive language model includes a second subset of items in the general language model;

generating a weighting factor that, when applied to the general language model, reduces probabilities associated with at least a portion of items in the general language model that are determined to be acoustically confusable for at least: a portion of items of the predicted utterance content, or a portion of items of the content catalog information;

recognizing a first item in a first utterance using the general language model in combination with the personal language model and the predictive language model, wherein the first item is recognized based at least partly on a first probability for the first item being higher than a second probability for a second item and a third probability for a third item, wherein a value of the first probability comprises a probability value from of the personal language model, wherein a value of the second probability comprises a probability value from the predictive language model, and wherein a value of the third probability comprises a product of the weighting factor and a probability value from the general language model; and causing audio content associated with the first item to be played by an output device.

5. The computer-implemented method of claim 4, wherein the content catalog information comprises at least one of a group consisting of: a catalog specific to the user profile; data regarding demographics; data regarding historical utterances; and data regarding historical behaviors.

6. The computer-implemented method of claim 4, further comprising performing at least one of automatic speech recognition or natural language understanding on a second utterance using the predictive language model interpolated with a second language model.

7. The computer-implemented method of claim 6, wherein the second language model is one of a content domain-specific personal language model or the general language model.

8. The computer-implemented method of claim 6, further comprising generating a second weighting factor for the predictive language model.

9. The computer-implemented method of claim 6, further comprising determining that the second utterance relates to a predicted item based at least on the predictive language model.

10. The computer-implemented method of claim 9, wherein the predicted item is related to an item in a catalog specific to the user profile.

11. The computer-implemented method of claim 4, further comprising analyzing content catalog information associated with a plurality of user profiles in comparison with the content catalog information associated with the user profile.

12. One or more non-transitory computer readable media comprising executable code that, when executed, cause one or more computing devices to perform a process comprising:

obtaining catalog information associated with a user profile;

generating a personal language model based at least on the catalog information, wherein the personal language model is specific to the user profile, wherein the personal language model includes a first subset of items in a general language model, and wherein the general language model is not associated with any specific user profile;

determining, based at least on the catalog information, predicted natural language processing input content, wherein the catalog information does not include the predicted natural language processing input content;

generating a predictive language model based at least on the predicted natural language processing input content, wherein the predictive language model is associated with the user profile, and wherein the predictive language model includes a subset of items in the general language model;

generating a weighting factor that, when applied to the predictive language model, modifies probabilities associated with at least a portion of items of the predicted natural language processing input content that are determined to be acoustically confusable for at least a portion of items in the general language model;

recognizing a first item in a first utterance using the general language model in combination with the personal language model and the predictive language model, wherein the first item is recognized based at least partly on a first probability for the first item being higher than a second probability for a second item and a third probability for a third item, wherein a value of the first probability comprises a product of the weighting factor and a probability value from the personal language model, wherein a value of the second probability comprises a probability value from the predictive language model, and wherein a value of the third probability comprises a probability value from the general language model; and causing audio content associated with the first item to be played by an output device.

13. The one or more non-transitory computer readable media of claim 12, wherein the process further comprises performing automatic speech recognition on a second utterance using the predictive language model interpolated with a second language model.

14. The one or more non-transitory computer readable media of claim 13, wherein the second language model is one of a domain-specific personal language model or the general language model.

15. The computer-implemented method of claim 4 further comprising:

identifying a first domain of a plurality of domains of predicted utterance content based at least partly on a first common classification of a group of items of the predicted utterance content, wherein the first common classification is associated with an age group of user profiles associated with the first group of items; and identifying a second domain of the plurality of domains of predicted utterance content based at least partly on a second common classification of a second group of items of the predicted utterance content, wherein the second common classification is associated with a common music artist.

16. The computer-implemented method of claim 4, wherein the first subset of items of the personal language model is distinct from the second subset of items of the predictive language model, and wherein the personal language model associates probabilities with items of the content catalog information that are higher than probabilities associated with the items of the content catalog information included in the general language model.

17. The system of claim 1, wherein the executable instructions to process the utterance using the personal language model in combination with the weighting factor and the general language model comprise instructions to multiply the weighting factor by at least a portion of the probabilities associated with items in the general language model that are determined to be acoustically confusable with the user-specific predicted items.

18. The computer-implemented method of claim 4, further comprising multiplying the weighting factor by the probabilities associated with the portion of items in the general language model to generate weighted probabilities, wherein the recognizing the first item comprises recognizing the first item using at least one of the weighted probabilities.

19. The one or more non-transitory computer readable media of claim 12, the process further comprising multiplying the weighing factor by at least a portion of the probabilities associated with items of the predicted natural language processing input content to generate weighted probabilities, wherein the recognizing the first item in the first utterance comprises recognizing the first item using at least one of the weighted probabilities.

20. The system of claim 1, wherein the weighting factor comprises a numerical value.

21. The computer-implemented method of claim 4, wherein the recognizing the first item in the first utterance comprises:

generating preliminary natural language processing results using the general language model; and modifying one or more scores of the preliminary natural language processing results using the predictive language model.

22. The computer-implemented method of claim 4, further comprising generating output data representing at least one of: an audio content item, or a visual content item.

* * * * *

UNITED STATES PATENT AND TRADEMARK OFFICE
CERTIFICATE OF CORRECTION

PATENT NO. : 10,049,656 B1
APPLICATION NO. : 14/033346
DATED : August 14, 2018
INVENTOR(S) : William Folwell Barton et al.

Page 1 of 1

It is certified that error appears in the above-identified patent and that said Letters Patent is hereby corrected as shown below:

In the Claims

In Column 14, Lines 28-29, Claim 4, change "from of" to --from--

Signed and Sealed this
Fourth Day of June, 2019

Andrei Iancu
*Director of the United States Patent and Trademark Office*